No. 676,603. Patented June 18, 1901.
A. H. DRAKE.
LID FOR COOKING UTENSILS.
(Application filed Feb. 28, 1901.)
(No Model.)
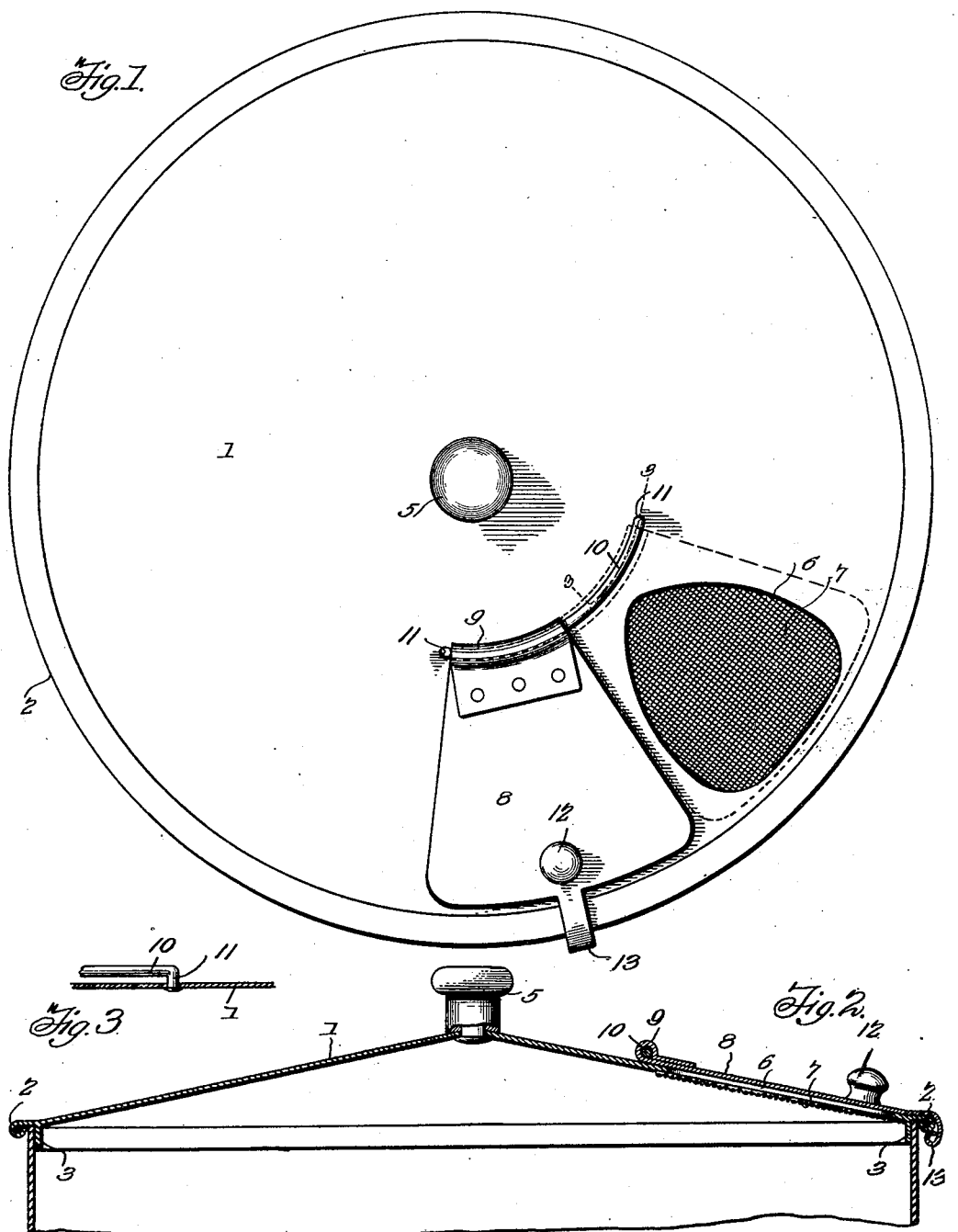
Witnesses
A. H. Drake, Inventor.
Attorneys

UNITED STATES PATENT OFFICE.

AFTON HILTON DRAKE, OF UNION, OREGON.

LID FOR COOKING UTENSILS.

SPECIFICATION forming part of Letters Patent No. 676,603, dated June 18, 1901.

Application filed February 28, 1901. Serial No. 49,329. (No model.)

*To all whom it may concern:*

Be it known that I, AFTON HILTON DRAKE, a citizen of the United States, residing at Union, in the county of Union and State of Oregon, have invented a new and useful Lid for Cooking Utensils, of which the following is a specification.

This invention relates to lids for cooking utensils, and has for its object to provide an improved device of this character which is constructed to facilitate the draining of water or other liquid from a utensil and at the same time retain the solid contents thereof. It is furthermore designed to provide an improved mounting of the adjustable closure for controlling the drain-opening in the lid, so as to prevent accidental displacement of said closure and at the same time insure the proper and effective operation thereof.

With these and other objects in view the present invention consists in the combination and arrangement of parts, as will be hereinafter more fully described, shown in the accompanying drawings, and particularly pointed out in the appended claim, it being understood that changes in the form, proportion, size, and minor details may be made within the scope of the claim without departing from the spirit or sacrificing any of the advantages of the invention.

In the drawings, Figure 1 is a top plan view of a lid constructed in accordance with the present invention. Fig. 2 is a central transverse sectional view thereof applied to a cooking utensil. Fig. 3 is a detail sectional view taken on the line 3 3 of Fig. 1.

Like characters of reference designate corresponding parts in all of the figures of the drawings.

In carrying out the present invention I provide a substantially circular lid 1, which is also slightly conical, there being a flat outwardly-directed outer marginal flange 2, that is beaded at its outer edge, so as to stiffen the same. A pendent marginal rim 3 is located at the inner marginal edge of the flange, so as to fit snugly within the open end of a utensil 4, as shown in Fig. 2 of the drawings. At the apex of the conical lid there is provided a knob-shaped handle 5 for convenience in applying and removing the lid.

Adjacent to the outer marginal edge of the lid there is provided a drain-opening 6, which is covered by a sheet of wire-gauze or other foraminous material 7, that is secured to the under side of the lid, so that the outer or upper side thereof may be free from projections adjacent to the opening.

For controlling the drain-opening there is provided a slidable closure-plate 8, of a size to cover the opening and mounted to slide upon the outer side of the lid. The inner or rear edge of the plate is folded upon itself to form a sleeve 9, which slidably embraces a guide-rod 10, carried by the outer side of the lid and disposed slightly above the same, so as to permit of the sleeve sliding freely thereon. This guide-rod is in the form of an arc struck from the apex of the lid as a center, and the sleeve is made arcuate to correspond thereto. As best shown in Fig. 3 of the drawings, each end of the rod is provided with a laterally-projected terminal leg or projection 11, that is passed inwardly through a perforation in the lid and then upset or otherwise secured to the under side of the lid, so as to space the rod away from the top of the lid.

As indicated in Fig. 1, the guide-rod projects at opposite sides of the drain-opening with one end portion projected more than the opposite end thereof, so that the closure-plate may be slid laterally and entirely to one side of the opening to uncover the latter, as shown in full lines, the closed position of the plate being shown in dotted lines. It will here be observed that the terminal legs of the guide-rod form stops for the closure-plate at opposite limits thereof, so that the slide is automatically stopped in both its closed and open positions.

A knob-shaped handle 12 rises from the slidable plate for the convenient movement thereof, and a hooked spring finger or catch 13 projects outwardly from the intermediate portion of the outer edge of the plate and is designed to be hooked over the outer marginal edge of the lid, so as to hold the plate down upon the lid.

In using the lid it is applied to a utensil in the ordinary manner, the closure-slide being located over the drain-opening, so as to prevent the escape of steam. When it is desired to drain the liquid from the utensil, the closure-plate is slid to its opposite open limit to uncover the drain-opening, after which the utensil is tilted, so as to pour the liquid outwardly through the opening in the lid, the screen 7 preventing the escape of the solid contents of the utensil.

I do not wish to be understood as limiting myself to a circular or conical lid, as flat rectangular lids may be employed, according to the shape of the utensil. In a rectangular lid the guide-rod would be straight, and in any event the guide-rod is parallel with the outer marginal edge of the lid, as the spring-catch is engaged therewith and slides thereon during the adjustment of the closure-plate.

What is claimed is—

A lid for cooking utensils, having a drain-opening formed therein, a guide-rod located transversely across one edge of the opening and provided with downwardly-offset terminal feet connected to the top of the lid, whereby the intermediate portion of the rod is spaced from the lid, the opposite end portions of the rod being projected in opposite directions outwardly beyond the opening, one end being adjacent to and the opposite end remote from the opening, and an adjustable cover for the opening, having a bearing-sleeve slidably embracing the rod and movable thereon in opposite directions for the entire length thereof, the opposite feet being constructed to form stops for engagement with the opposite ends of the bearing-sleeve and thereby to limit the opposite movements of the slidable cover, the stop-foot which is adjacent to the opening being constructed to stop the cover when closing the opening, and the opposite remote stop-foot being located at a distance at least equal to the width of the cover away from the opening and constructed to stop the cover when it has been slid clear of the opening.

In testimony that I claim the foregoing as my own I have hereto affixed my signature in the presence of two witnesses.

AFTON HILTON DRAKE.

Witnesses:
  M. F. DAVIS,
  L. J. DAVIS.